US010627550B2

(12) United States Patent
Liu et al.

(10) Patent No.: US 10,627,550 B2
(45) Date of Patent: Apr. 21, 2020

(54) FINGERPRINT RECOGNITION SENSOR, MANUFACTURING METHOD THEREOF AND DISPLAY DEVICE

(71) Applicant: BOE TECHNOLOGY GROUP CO., LTD., Beijing (CN)

(72) Inventors: Wenqu Liu, Beijing (CN); Feng Zhang, Beijing (CN); Zhijun Lv, Beijing (CN); Liwen Dong, Beijing (CN); Shizheng Zhang, Beijing (CN); Ning Dang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 217 days.

(21) Appl. No.: 15/923,257

(22) Filed: Mar. 16, 2018

(65) Prior Publication Data

US 2019/0094425 A1 Mar. 28, 2019

(30) Foreign Application Priority Data

Sep. 27, 2017 (CN) .......................... 2017 1 0890274

(51) Int. Cl.
G02B 5/00 (2006.01)
G06K 9/00 (2006.01)
(52) U.S. Cl.
CPC ........... *G02B 5/003* (2013.01); *G06K 9/0004* (2013.01); *G06K 9/00013* (2013.01)
(58) Field of Classification Search
CPC ............... G02B 5/003; G06K 9/00013; G06K 9/00892; G06K 9/00006;
(Continued)

(56) References Cited

U.S. PATENT DOCUMENTS 9,952,713 B2 * 4/2018 Takahashi ............... G06F 3/044
10,387,712 B2 * 8/2019 Zeng ..................... G06K 9/0008
(Continued)

FOREIGN PATENT DOCUMENTS

CN 104851891 A 8/2015
CN 106206622 A 12/2016
(Continued)

OTHER PUBLICATIONS

First Office Action for Chinese Patent Application No. 201710890274.6 dated Aug. 13, 2019.

Primary Examiner — Michael S Osinski
(74) Attorney, Agent, or Firm — Calfee, Halter & Griswold LLP

(57) ABSTRACT

A fingerprint recognition sensor includes a plurality of fingerprint recognition units arranged in an array. Each of the fingerprint recognition units includes a base substrate, an image capturing device disposed on one side of the substrate, and a first grating structure and a second grating structure sequentially disposed on the other side of the base substrate, the first grating structure has a first imaging hole at a position opposite to the image capturing device and the second grating structure has a second imaging hole at a position opposite to the image capturing device, and an extending direction of a slit of the first grating structure is perpendicular to an extending direction of a slit of the second grating structure.

20 Claims, 4 Drawing Sheets

(58) Field of Classification Search
CPC ... G06K 9/0002–0008; G06K 9/00107; G06K 9/0012; G06K 9/00885; G06K 9/2018; G06K 9/00067; G06K 9/00496; G06K 2009/00932–00939; H04N 5/2256; A61B 5/1172; A61B 5/489; A61B 5/117; A61B 5/6826; A61B 5/0261; G06F 3/044; G06F 21/32; G06F 21/83; G06T 7/0002–0012
See application file for complete search history.

(56) References Cited

U.S. PATENT DOCUMENTS

| | | | |
|---|---|---|---|
| 10,503,947 B2 * | 12/2019 | Liu | G06K 9/00013 |
| 10,503,953 B2 * | 12/2019 | Cheng | G06K 9/0004 |
| 10,528,783 B2 * | 1/2020 | Zhang | G06K 9/0004 |
| 2010/0097548 A1 * | 4/2010 | Koito | G02F 1/13338 349/113 |
| 2012/0241769 A1 * | 9/2012 | Katoh | H01L 27/14632 257/84 |
| 2013/0120760 A1 * | 5/2013 | Raguin | G01B 11/24 356/612 |
| 2013/0162570 A1 * | 6/2013 | Shin | G06F 3/041 345/173 |
| 2013/0207190 A1 * | 8/2013 | Kaigawa | H01L 27/1214 257/347 |
| 2013/0235294 A1 * | 9/2013 | Nomura | G02F 1/133345 349/43 |
| 2014/0055412 A1 * | 2/2014 | Teramoto | G06F 3/0412 345/174 |
| 2014/0061597 A1 * | 3/2014 | Choi | H01L 51/5284 257/40 |
| 2014/0070350 A1 * | 3/2014 | Kim | G06F 3/0412 257/432 |
| 2015/0049030 A1 * | 2/2015 | Her | G06F 3/0412 345/173 |
| 2015/0162389 A1 * | 6/2015 | Zhang | H01L 51/5206 257/40 |
| 2015/0261370 A1 * | 9/2015 | Yoo | G06F 3/0412 345/173 |
| 2016/0098140 A1 * | 4/2016 | Lee | G06F 3/0416 345/173 |
| 2016/0104739 A1 * | 4/2016 | Kumano | H01L 27/14634 257/432 |
| 2016/0109994 A1 * | 4/2016 | Liu | G06F 3/0412 345/174 |
| 2016/0246408 A1 * | 8/2016 | Wang | G06F 3/044 |
| 2017/0017335 A1 * | 1/2017 | Takahashi | G06F 3/044 |
| 2017/0090637 A1 * | 3/2017 | Yoon | H04M 1/0266 |
| 2017/0147850 A1 * | 5/2017 | Liu | G06K 9/0002 |
| 2017/0153766 A1 * | 6/2017 | Kimura | G02F 1/1368 |
| 2017/0161544 A1 * | 6/2017 | Fomani | G01J 1/0214 |
| 2017/0299908 A1 * | 10/2017 | Peng | G06F 3/044 |
| 2017/0372113 A1 * | 12/2017 | Zhang | G02B 5/3025 |
| 2018/0165496 A1 * | 6/2018 | Cheng | G06K 9/00053 |
| 2018/0166507 A1 * | 6/2018 | Hwang | H01L 27/323 |
| 2018/0196545 A1 * | 7/2018 | Wang | G06F 3/0416 |
| 2018/0203554 A1 * | 7/2018 | Cho | G06F 3/0412 |
| 2018/0358413 A1 * | 12/2018 | Lee | H01L 51/5253 |
| 2018/0374955 A1 * | 12/2018 | Yoshida | G02F 1/133345 |
| 2019/0019856 A1 * | 1/2019 | Miyanaga | G02F 1/133345 |
| 2019/0156097 A1 * | 5/2019 | Liu | G06K 9/0004 |

FOREIGN PATENT DOCUMENTS

| | | |
|---|---|---|
| CN | 106298859 A | 1/2017 |
| CN | 106898710 A | 6/2017 |
| CN | 106934379 A | 7/2017 |
| CN | 106940488 A | 7/2017 |
| CN | 106951815 A | 7/2017 |
| CN | 107146809 A | 9/2017 |
| CN | 107168465 A | 9/2017 |

* cited by examiner

FINGERPRINT RECOGNITION SENSOR, MANUFACTURING METHOD THEREOF AND DISPLAY DEVICE

CROSS REFERENCE TO RELATED APPLICATIONS

This application claims the benefit of China Patent Application No. 201710890274.6 and titled "Fingerprint Recognition Sensor, Manufacturing Method Thereof and Display Device" filed with the China Patent Office on Sep. 27, 2017, the entire content of which is hereby incorporated by reference.

TECHNICAL FIELD

The disclosure relates to the technical field of fingerprint recognition, and in particular, to a fingerprint recognition sensor, a manufacturing method thereof and a display device.

BACKGROUND

With the rapid development of e-commerce and e-banking, demands for security are getting higher and higher. How to accurately identify individuals and protect information security is a key social issue that must be solved in today's information age. Biometric identification by using the body's inherent physiological or behavioral characteristics for personal identification has high security, and has gradually become popular in daily lives. Biometrics identification usually includes face recognition, fingerprint recognition, iris recognition, voice recognition, hand vein recognition and so on.

Organic Light-Emitting Diode (OLED) display devices have the advantages of thin size, light weight, wide viewing angles, active light emission, continuously adjustable emission colors, low cost, fast response, low energy consumption, low driving voltage, wide operation temperature range, simple production process, high luminous efficiency and flexible display, etc., and have been listed as a very promising next-generation display technology.

A display panel with fingerprint recognition usually utilizes an opaque metal light-shielding layer to block light. However, the metal light-shielding layer forms a large area of metal region on the surface of the glass substrate. When the display panel is pressed, the metal light-shielding layer generates a large stress, so that the glass substrate is easily deformed and affects the subsequent manufacturing process. The metal light-shielding layer is a large area of metal layer and may generate protrusions in the subsequent chemical vapor deposition process, making it easy to break the display panel, thereby reducing the product quality of the display device. In addition, providing a large area of metal light-shielding layer will lead to the appearance of additional capacitance and thus resulting in circuit delay, load increases and other issues.

SUMMARY

According to an embodiment of the present disclosure, there is provided a fingerprint sensor including a plurality of fingerprint recognition units arranged in an array, wherein:

each of the fingerprint recognition units includes a base substrate, an image capturing device disposed on one side of the base substrate, and a first grating structure and a second grating structure sequentially disposed on the other side of the base substrate; the first grating structure has a first imaging hole at a position opposite to the image capturing device and the second grating structure has a second imaging hole at a position opposite to the image capturing device, and an extending direction of a slit of the first grating structure is perpendicular to an extending direction of a slit of the second grating structure.

In an embodiment, the first imaging hole and the second imaging hole have the same shape and size.

In an embodiment, the first imaging hole and the second imaging hole are circular holes and each has a diameter less than or equal to 3.8 um. The first imaging hole and the second imaging hole of such size enable the fingerprint to be projected on the image capturing device more clearly.

In an embodiment, the first grating structure and the second grating structure each includes a plurality of light shielding bars arranged in parallel, and a slit is formed between two adjacent parallel light shielding bars;

a distance d1 between two adjacent light shielding bars of the first grating structure satisfies $d1 \leq 120$ nm, and a distance d2 between two adjacent light shielding bars of the second grating structure satisfies $d2 \leq 120$ nm.

In an embodiment, the first grating structure and the second grating structure each includes a plurality of light shielding bars arranged in parallel, and a slit is formed between two adjacent parallel light shielding bars; and a ratio of a width of the light shielding bar of the first grating structure to a thickness of the light shielding bar is 1:3; and/or a ratio of a width of the light shielding bar of the second grating structure to a thickness of the light shielding bar is 1:3.

In an embodiment, material of the first grating structure includes molybdenum, titanium aluminum titanium alloy, molybdenum aluminum alloy or molybdenum neodymium molybdenum alloy; and/or material of the second grating structure includes molybdenum, titanium aluminum titanium alloy, molybdenum aluminum alloy or molybdenum neodymium molybdenum alloy.

Preferably, each of the fingerprint recognition units further includes a thin film transistor disposed on one side of the second grating structure away from the base substrate, the thin film transistor includes an active layer, a first gate electrode, a second gate electrode and a source drain layer sequentially disposed in a direction away from the base substrate, and the source drain layer has a light transmission hole at a position opposite to the image capturing device.

In an embodiment, the source drain layer includes a first source electrode connected to the active layer, a second source electrode connected to the first gate electrode, a third source electrode connected to the second gate electrode, and the third source electrode has a light transmission hole at a position opposite to the image capturing device.

In an embodiment, a diameter of the light transmission hole is less than or equal to 6.2 um.

An embodiment of the present disclosure provides a method for manufacturing the fingerprint sensor according to the above embodiments, including:

forming a first adhesive layer on one side of the base substrate;

imprinting and transferring a first grating structure pattern of a first template onto a surface of the first adhesive layer away from the base substrate, to form a first grating structure layer having a first imaging hole;

forming a second adhesive layer on one side of the first grating structure layer away from the base substrate; and imprinting and transferring a second grating structure pattern of a second template onto a surface of the second adhesive layer away from the base substrate, to form a second grating structure layer having a second imaging hole;

wherein the second imaging hole is opposite to the first imaging hole, and an extending direction of a slit of the second grating structure layer is perpendicular to an extending direction of a slit of the first grating structure layer.

An embodiment of the present disclosure also provides a display device including the fingerprint sensor according to the above.

DETAILED DESCRIPTION

In order to improve product quality of the display device, embodiments of the present disclosure provide a fingerprint recognition sensor, a manufacturing method thereof and a display device. To make the objectives, technical solutions, and advantages of the present disclosure more comprehensible, the present disclosure will be further described in detail with reference to the following embodiments.

Figure 1:
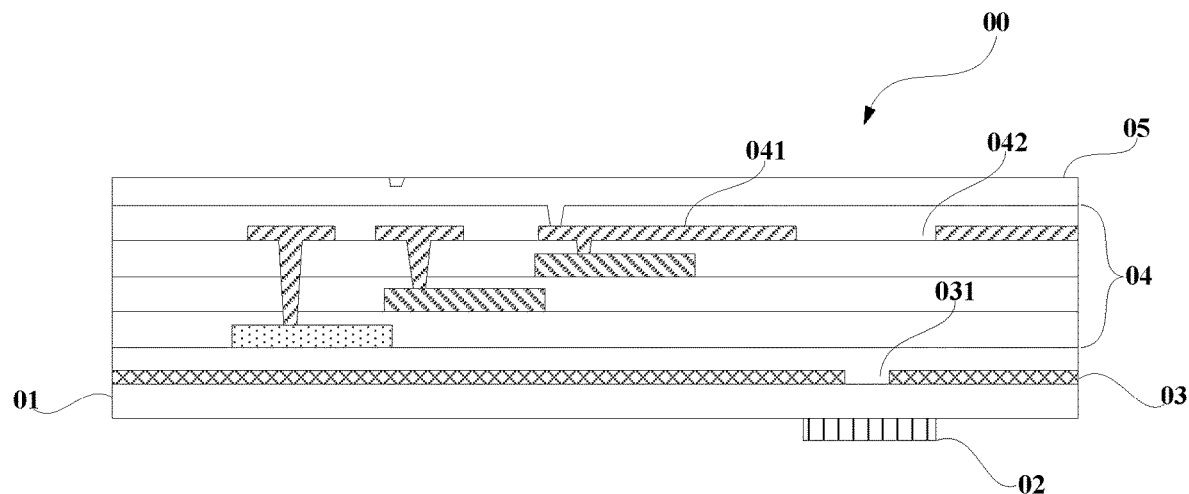
FIG. 1 is a schematic structural diagram of a fingerprint recognition area of a display panel in the related art.

In the related art, as shown in FIG. 1, the display panel includes a display area (not shown in the figure) and a fingerprint recognition area 00. The fingerprint recognition area 00 includes a base substrate 01, an image sensor 02 disposed on one side of the base substrate 01, and a metal light-shielding layer 03, a thin film transistor 04 and an OLED device 05 sequentially disposed on the other side of the base substrate 01. An imaging hole 031 is disposed on the metal light-shielding layer 03 adjacent to the base substrate 01, at a position opposite to the image sensor 02. A light transmission hole 042 is disposed on the source drain layer 041 of the thin film transistor 04, at a position opposite to the image sensor 02. When a finger presses on the fingerprint recognition area 00 of the display panel, the light emitted from the OLED device 05 irradiates on the finger and is diffused and reflected by the finger. The reflected light sequentially passes through the light transmission hole 042 and the imaging hole 031, and when the light passes through the imaging hole 031, aperture imaging occurs and the light is projected on the image sensor 02. The image sensor 02 performs photoelectric conversion on the received image to perform fingerprint recognition. However, when fingerprint recognition is performed on the fingerprint recognition area 00, a large stress is generated on the metal light-shielding layer 03 due to the finger pressing the display panel, so that the base substrate 01 may be easily deformed and affect the subsequent manufacturing process. In addition, the metal light-shielding layer 03 is a large area of metal layer and may generate protrusions in the subsequent chemical vapor deposition process, making it easy to break the display panel, thereby reducing the product quality of the display device.

Figure 2:
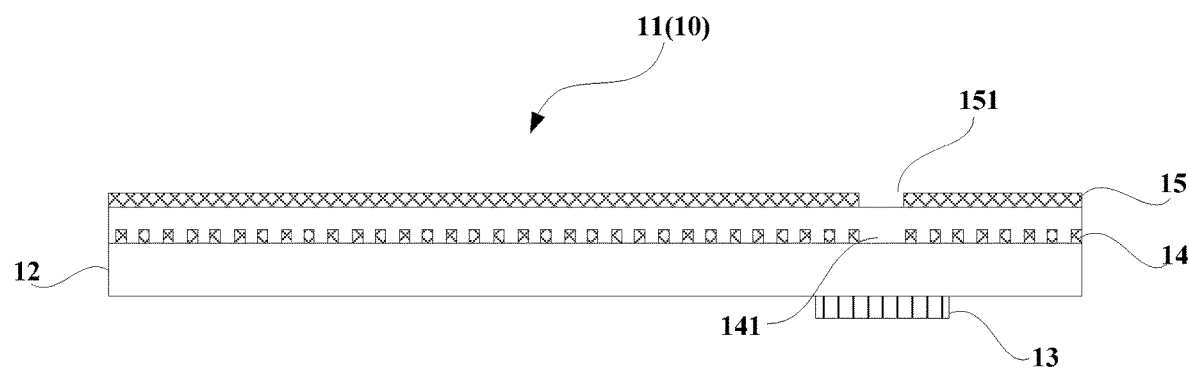
FIG. 2 is a schematic structural diagram of a fingerprint recognition sensor according to an embodiment of the present disclosure.
Figure 3:
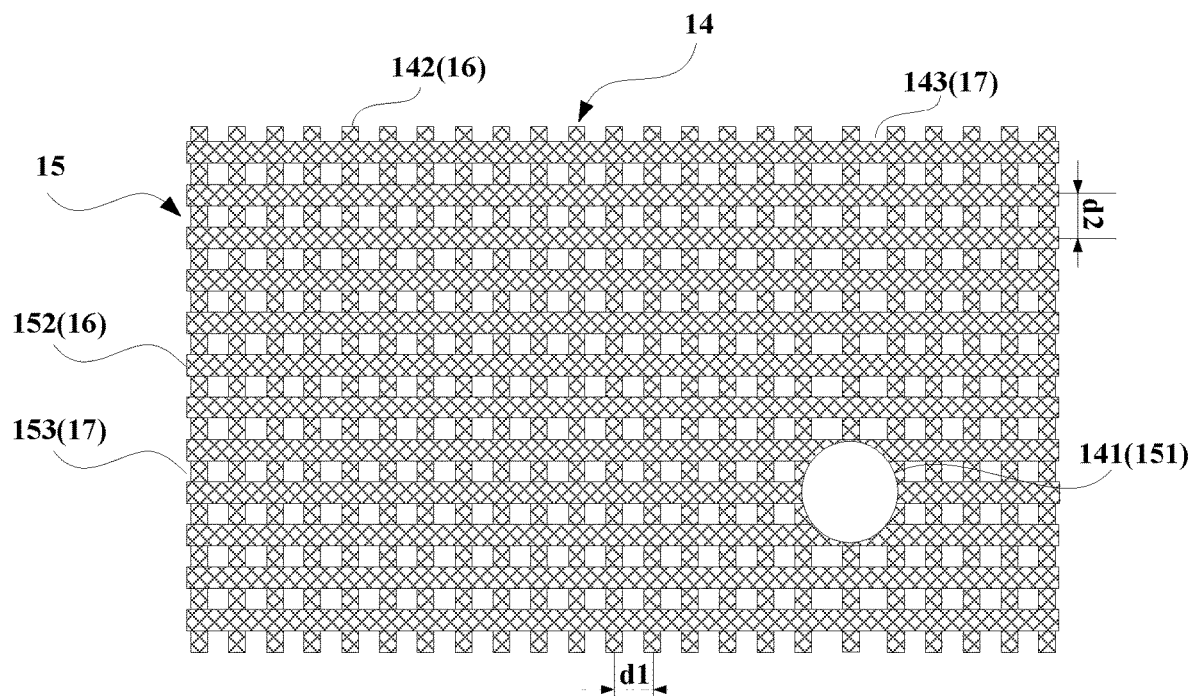
FIG. 3 is a schematic diagram of a first grating structure and a second grating structure according to an embodiment of the present disclosure.

As shown in FIG. 2 and FIG. 3, an embodiment of the present disclosure provides a fingerprint sensor 10, which includes a plurality of fingerprint recognition units 11 arranged in an array. Each fingerprint recognition unit 11 includes a base substrate 12, an image capturing device 13 disposed on one side of the base substrate 12, and a first grating structure 14 and a second grating structure 15 sequentially disposed on the other side of the base substrate 12. The first grating structure 14 has a first imaging hole 141 at a position opposite to the image capturing device 13. The second grating structure 15 has a second imaging hole 151 at a position opposite to the image capturing device 13. The extending direction of the slit of the first grating structure 14 is perpendicular to the extending direction of the slit of the second grating structure 15.

The fingerprint sensor 10 provided by the embodiment of the present disclosure is applied to a display device. To recognize a fingerprint, light is diffused and reflected by the finger, and the reflected light sequentially passes through the first imaging hole 141 and the second imaging hole 151. When the reflected light passes through the first imaging hole 141 and the second imaging hole 151, aperture imaging occurs and the light projected on the image capturing device 13. The image capturing device 13 performs photoelectric conversion on the received image to perform fingerprint recognition. Since the extending direction of the slit of the first grating structure 14 is perpendicular to the extending direction of the slit of the second grating structure 15 for shielding the light, light incident on the image capturing device 13 from areas outside the first imaging hole 141 and the second imaging hole 151 can be reduced, to make the aperture imaging clearer. The fingerprint sensor 10 of such structure can reduce the stress on the first grating structure 141 and the second grating structure 151 when the display device is pressed with a finger, alleviate the deformation of the base substrate 12 due to the stress, thereby improving the product quality of the display device.

As shown in FIG. 3, in the embodiment of the present disclosure, the first grating structure 14 and the second grating structure 15 respectively include a plurality of light shielding bars 16 arranged in parallel, and a slit 17 formed between two adjacent light shielding bars 16. The first grating structure 14 includes a plurality of first light shielding bars 142 arranged in parallel. A first slit 143 is formed between two adjacent first light shielding bars 142. The first slit 143 can only allow light having a vibration direction extending along the direction of the first slit 143 to pass through. The second grating structure 15 includes a plurality of second light shielding bars 152 arranged in parallel, and a second slit 153 is formed between two adjacent second light shielding bars 152. The second slit 153 can only allow light having a vibration direction extending along the direction of the second slit 153 to pass through. When the light passes through the first grating structure 14 and reaches the second grating structure 15, since the vibration direction of the light extends along the direction of the first slit 153, the light cannot pass through the second slit 153, thereby achieving the effect of shielding light for the first grating structure 14 and reaches the second grating structure 15.

In the above embodiment, preferably, a distance d1 between two adjacent light shielding bars 16 of the first grating structure 14 satisfies: d1≤120 nm, and a distance d2 between two adjacent light shielding bars 16 of the second grating structure 15 satisfies: d2≤120 nm. With such dimension designed for the first grating structure 14 and the second grating structure 15, light incident on the image capturing device 13 from areas outside the first imaging hole 141 and the second imaging hole 151 can be reduced, to make the aperture imaging clearer.

In addition, in the above embodiment, preferably, the ratio of the width of the light shielding bar 16 of the first grating structure 14 to the thickness of the light shielding bar 16 is 1:3; and/or, the width of the light shielding bar 16 of the second grating structure 15 to the thickness of the light shielding bar 16 is 1:3. With such dimension designed for the first grating structure 14 and the second grating structure 15, light incident on the image capturing device 13 from areas outside the first imaging hole 141 and the second imaging hole 151 can be reduced, to make the aperture imaging clearer.

In an embodiment of the present disclosure, a specific material of the first grating structure 14 is not limited, and may be, for example, molybdenum, titanium aluminum titanium alloy, molybdenum aluminum alloy, or molybdenum neodymium molybdenum alloy.

In an embodiment of the present disclosure, a specific material of the second grating structure 15 is not limited, and may be, for example, molybdenum, titanium aluminum titanium alloy, molybdenum aluminum alloy, or molybdenum neodymium molybdenum alloy.

In any of the above embodiments, preferably, the shapes or the sizes of the first imaging hole 141 and the second imaging hole 151 are the same so that the fingerprint can be projected on the image capturing device 13 more clearly, and the uniformity of the imaging can be better. In the embodiments of the present disclosure, the specific shapes of the first imaging hole 141 and the second imaging hole 151 are not limited, and may be, for example, a circle or a rectangle. Preferably, the first imaging hole 141 and the second imaging hole 151 are circular holes and each has a diameter less than or equal to 3.8 um.

Figure 4:
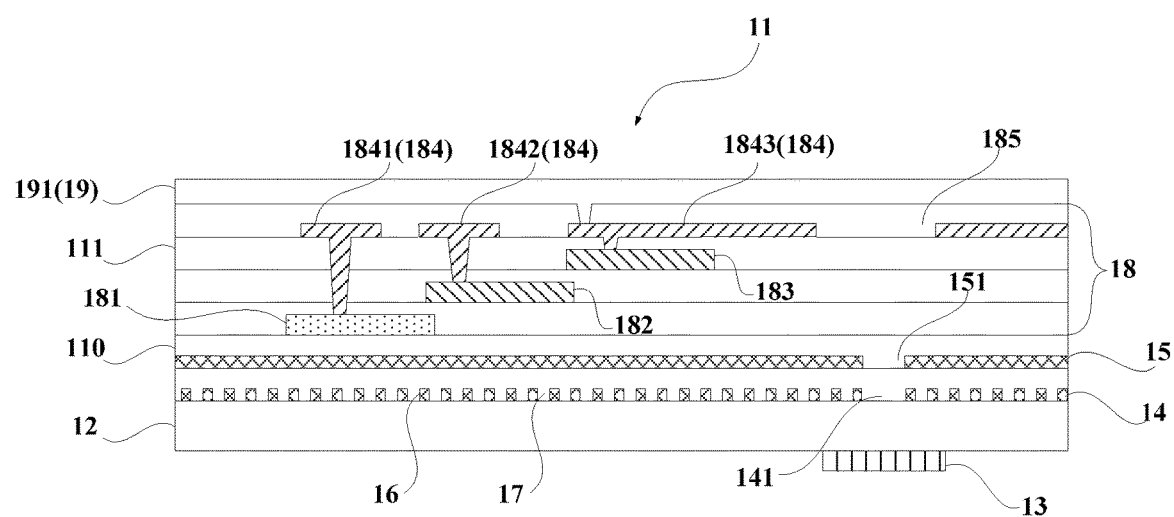
FIG. 4 is another schematic structural diagram of a fingerprint recognition sensor according to an embodiment of the present disclosure.

As shown in FIG. 4, in the above embodiment, each of the fingerprint recognition units 11 further includes a thin film transistor 18 disposed on one side of the second grating structure 15 away from the base substrate 12. The thin film transistor 18 includes an active layer 181, a first gate electrode 182, a second gate electrode 183 and a source drain layer 184 which are sequentially disposed in a direction away from the base substrate 12. The source drain layer 184 has a light transmission hole 185 at a position opposite to the image capturing device 13.

Also referring to FIG. 4, the source drain layer 184 includes a first source electrode 1841 connected to the active layer 181, a second source electrode 1842 connected to the first gate electrode 182, and a third source electrode 1843 connected to the second gate electrode 183. The third source electrode 1843 has a light transmission hole 185 at a position opposite to the image capturing device 13. When the fingerprint sensor 10 of such structure is applied to a display panel, the display panel includes a plurality of display pixel units arranged in an array, and the fingerprint recognition units 11 are disposed in one-to-one correspondence with the plurality of display pixel units. The first gate electrode 182 and the second gate electrode 183 of the thin film transistor 18 respectively control different display pixel units, so that the pixel area is smaller while the aperture ratio of the pixel electrode is constant. Thereby, it can improve the aperture ratio of the display pixel unit and further improve the display resolution of the fingerprint on the image capturing device 13.

In any of the above embodiments, preferably, the diameter of the light transmission hole 185 is less than or equal to 6.2 um. In order to improve the light phenomenon and improve the fingerprint recognition effect, the following may be calculated according to the imaging simulation of ±45°:

$$D=2*(d/2+h)$$

When the diameter d of the first imaging hole 141 or the second imaging hole 151 is less than or equal to 3.8 um, and according to the prior art, h (h is the film thickness between the buffer layer 110 and the dielectric layer 111 as shown in FIG. 4) is 1.2 um, the maximum size of the diameter D of the light transmission hole 185 is 6.2 um.

When collecting the fingerprint, the plurality of fingerprint recognition units 11 divides the fingerprint information into a plurality of corresponding fingerprint data, and the plurality of light transmission holes 185 designed with the size can more accurately project the fingerprint, so as to improve the resolution and accuracy of the fingerprint recognition.

In the embodiment of the present disclosure, the fingerprint sensor 10 further includes an OLED device 19 disposed on one side of the thin film transistor 18 away from the base substrate 12. The OLED device 19 includes an anode 191, a light emitting layer and a cathode disposed in sequence. The anode 191 is disposed on one side of the third source electrode 1843 away from the base substrate 12 and electrically connected to the third source electrode 1843. When the second gate electrode 183 and the third source electrode 1843 are turned on, the OLED device 19 emits a light irradiating the finger and diffused and reflected by the finger, thereby generating aperture imaging for fingerprint recognition. In this embodiment, preferably, the cathode of the OLED device 19 is a transparent cathode, so that the light emitted from the light emitting layer can be transmitted through the transparent cathode to the finger, so that the fingerprint recognition can be clearer.

Figure 5:
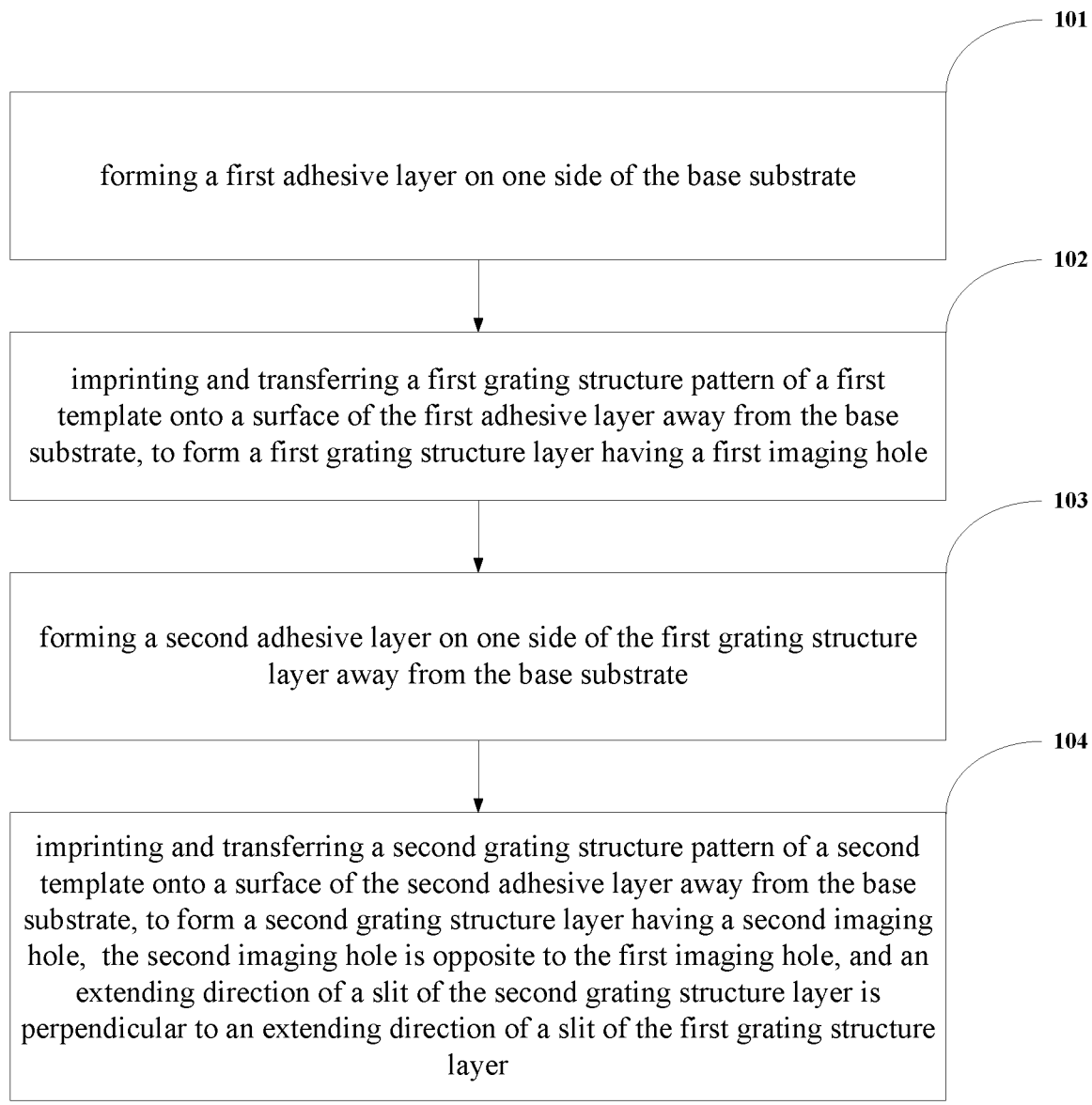
FIG. 5 is a schematic flow chart of a method for manufacturing a fingerprint recognition sensor according to an embodiment of the present disclosure.

As shown in FIG. 5, an embodiment of the present disclosure further provides a method for manufacturing a fingerprint sensor according to the foregoing embodiment, which includes the following steps.

In step 101, a first adhesive layer is formed on one side of the base substrate.

In step 102, the first grating structure pattern of the first template is imprinted and transferred onto a surface of the first adhesive layer away from the base substrate, to form a first grating structure layer, and the first grating structure layer has a first imaging hole.

In step 103, a second adhesive layer is formed on one side of the first grating structure layer away from the base substrate.

In step 104, a second grating structure pattern of the second template is imprinted and transferred onto a surface of the second adhesive layer away from the base substrate, to form a second grating structure layer, and the second grating structure layer has a second imaging hole. The second imaging hole is opposite to the first imaging hole, and the extending direction of the slit of the second grating structure layer is perpendicular to the extending direction of the slit of the first grating structure layer.

In the manufacturing method provided by the embodiment of the present disclosure, a fingerprint sensor is manufactured by using a nanoimprint process. When applied to display device for fingerprint recognition, the extending direction of the slit of the first grating structure is perpendicular to the extending direction of the slit of the second grating structure, for shielding the light. Thus, it can reduce the light incident on the image capturing device from areas outside the first imaging hole and the second imaging hole, to make the aperture imaging clearer. The fingerprint sensor of such structure can reduce the stress on the first grating structure and the second grating structure when the display device is pressed with a finger, alleviate the deformation of the base substrate due to the stress, thereby improving the product quality of the display device.

Figure 6:
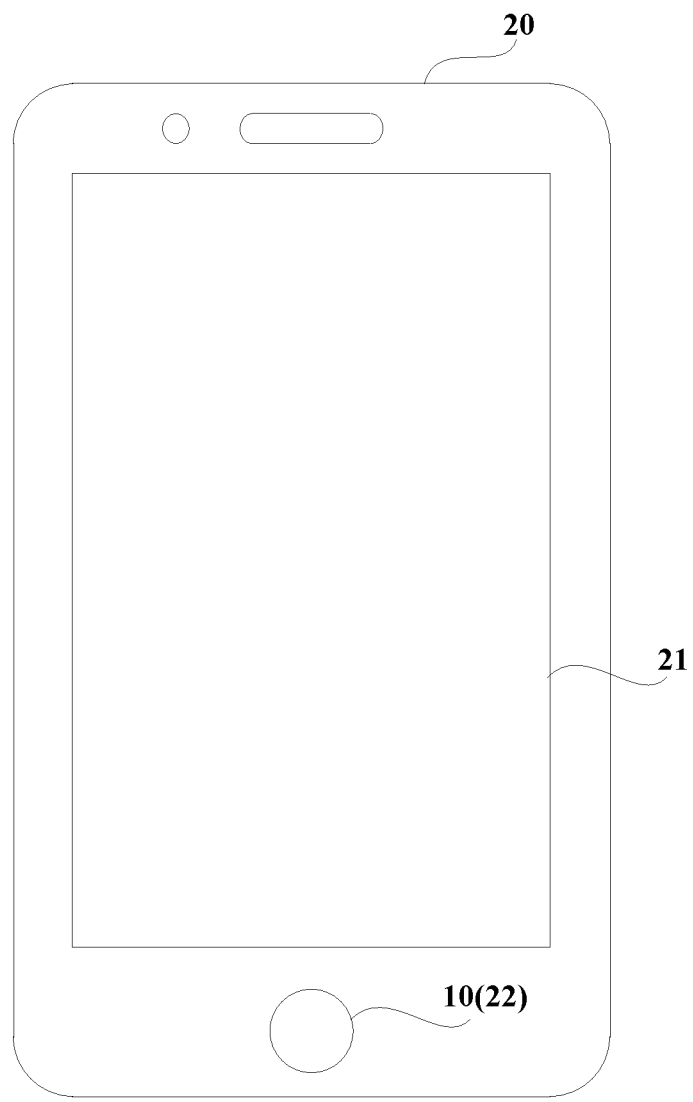
FIG. 6 is a schematic diagram of a display device according to an embodiment of the present disclosure.

As shown in FIG. 6, an embodiment of the present disclosure further provides a display device 20, including the fingerprint sensor 10 according to any one of the foregoing embodiments.

Referring to FIG. 6, in an embodiment of the present disclosure, the display device 20 is a mobile phone and includes a display area 21 and a fingerprint recognition area 22. The fingerprint recognition area 22 includes the fingerprint sensor 10.

In the display device 20 provided in this embodiment of the present disclosure, to recognize a fingerprint, the extending direction of the slit of the first grating structure of the fingerprint sensor 10 is perpendicular to the extending direction of the slit of the second grating structure, for shielding the light. Thus, it can reduce the light incident on the image capturing device from areas outside the first imaging hole and the second imaging hole, to make the aperture imaging clearer. The fingerprint sensor 10 of such structure can reduce the stress on the first grating structure and the second grating structure when the display device is pressed with a finger 20, alleviate the deformation of the base substrate due to the stress, thereby improving the product quality of the display device 20.

In the foregoing embodiment, the specific type of the display device 20 is not limited, and may be, for example, a fingerprint recognition device, a tablet, an electronic paper, a television or a fingerprint card press.

Apparently, those skilled in the art may make various modifications and variations to the present disclosure without departing from the spirit and scope of the disclosure. In this way, if these modifications and variations of the disclosure fall within the scope of the claims of the disclosure and the equivalent technologies, the disclosure is also intended to include these modifications and variations.

What is claimed is:

1. A fingerprint sensor comprising a plurality of fingerprint recognition units arranged in an array, wherein:
   each of the fingerprint recognition units comprises a base substrate, an image capturing device disposed on a first side of the base substrate, and a first grating structure and a second grating structure sequentially disposed on a second side opposite to the first side of the base substrate; wherein the first grating structure comprises a first imaging hole at a position opposite to the image capturing device and the second grating structure comprises a second imaging hole at a position opposite to the image capturing device, and an extending direction of a slit of the first grating structure is perpendicular to an extending direction of a slit of the second grating structure.

2. The fingerprint sensor according to claim 1, wherein the first imaging hole and the second imaging hole have the same shape and size.

3. The fingerprint sensor according to claim 2, wherein the first imaging hole and the second imaging hole are circular holes and each has a diameter less than or equal to 3.8 um.

4. The fingerprint sensor according to claim 1, wherein the first grating structure and the second grating structure each comprises a plurality of light shielding bars arranged in parallel, and a slit is formed between two adjacent parallel light shielding bars;
   a distance d1 between two adjacent light shielding bars of the first grating structure satisfies d1≤120 nm, and a distance d2 between two adjacent light shielding bars of the second grating structure satisfies d2≤120 nm.

5. The fingerprint sensor according to claim 1, wherein the first grating structure and the second grating structure each comprises a plurality of light shielding bars arranged in parallel, and a slit is formed between two adjacent parallel light shielding bars; and
   a ratio of a width of the light shielding bar of the first grating structure to a thickness of the light shielding bar is 1:3.

6. The fingerprint sensor according to claim 1, wherein the first grating structure and the second grating structure each comprises a plurality of light shielding bars arranged in parallel, and a slit is formed between two adjacent parallel light shielding bars;
   a ratio of a width of the light shielding bar of the second grating structure to a thickness of the light shielding bar is 1:3.

7. The fingerprint sensor according to claim 1, wherein the first grating structure and the second grating structure each comprises a plurality of light shielding bars arranged in parallel, and a slit is formed between two adjacent parallel light shielding bars;
   a ratio of a width of the light shielding bar of the first grating structure to a thickness of the light shielding bar is 1:3; and a ratio of a width of the light shielding bar of the second grating structure to a thickness of the light shielding bar is 1:3.

8. The fingerprint sensor according to claim 1, wherein material of the first grating structure comprises molybdenum, titanium aluminum titanium alloy, molybdenum aluminum alloy or molybdenum neodymium molybdenum alloy.

9. The fingerprint sensor according to claim 1, wherein material of the second grating structure comprises molybdenum, titanium aluminum titanium alloy, molybdenum aluminum alloy or molybdenum neodymium molybdenum alloy.

10. The fingerprint sensor according to claim 1, wherein material of the first grating structure comprises molybdenum, titanium aluminum titanium alloy, molybdenum aluminum alloy or molybdenum neodymium molybdenum alloy; and material of the second grating structure comprises molybdenum, titanium aluminum titanium alloy, molybdenum aluminum alloy or molybdenum neodymium molybdenum alloy.

11. The fingerprint sensor according to claim 1, wherein each of the fingerprint recognition units further comprises a thin film transistor disposed on one side of the second grating structure away from the base substrate, the thin film transistor comprises an active layer, a first gate electrode, a second gate electrode and a source drain layer sequentially disposed in a direction away from the base substrate, and the source drain layer has a light transmission hole at a position opposite to the image capturing device.

12. The fingerprint sensor according to claim 11, wherein the source drain layer comprises a first source electrode connected to the active layer, a second source electrode connected to the first gate electrode, a third source electrode connected to the second gate electrode, and the third source electrode has a light transmission hole at a position opposite to the image capturing device.

13. The fingerprint sensor according to claim 11, wherein a diameter of the light transmission hole is less than or equal to 6.2 um.

14. The fingerprint sensor according to claim 12, wherein a diameter of the light transmission hole is less than or equal to 6.2 um.

15. A method for manufacturing the fingerprint sensor according to claim 1, comprising:
 forming a first adhesive layer on the second side of the base substrate;
 imprinting and transferring a first grating structure pattern of a first template onto a surface of the first adhesive layer away from the base substrate, to form a first grating structure layer having a first imaging hole;
 forming a second adhesive layer on one side of the first grating structure layer away from the base substrate; and
 imprinting and transferring a second grating structure pattern of a second template onto a surface of the second adhesive layer away from the base substrate, to form a second grating structure layer having a second imaging hole;
 wherein the second imaging hole is opposite to the first imaging hole, and an extending direction of a slit of the second grating structure layer is perpendicular to an extending direction of a slit of the first grating structure layer.

16. A display device comprising the fingerprint sensor according to claim 1.

17. The display device according to claim 16, wherein the first imaging hole and the second imaging hole have the same shape and size.

18. The display device according to claim 16, wherein the first imaging hole and the second imaging hole are circular holes and each has a diameter less than or equal to 3.8 um.

19. The display device according to claim 16, wherein the first grating structure and the second grating structure each comprises a plurality of light shielding bars arranged in parallel, and a slit is formed between two adjacent parallel light shielding bars;
 a distance d1 between two adjacent light shielding bars of the first grating structure satisfies $d1 \leq 120$ nm, and a distance d2 between two adjacent light shielding bars of the second grating structure satisfies $d2 \leq 120$ nm.

20. The display device according to claim 16, wherein the first grating structure and the second grating structure each comprises a plurality of light shielding bars arranged in parallel, and a slit is formed between two adjacent parallel light shielding bars; and
 a ratio of a width of the light shielding bar of the first grating structure to a thickness of the light shielding bar is 1:3.

* * * * *